United States Patent Office.

JOHN E. SIEBEL, OF CHICAGO, ILLINOIS.

Letters Patent No. 93,131, dated July 27, 1869.

IMPROVED PREPARATION OF IRON FOR MEDICAL PURPOSES.

The Schedule referred to in these Letters Patent and making part of the same.

*To all whom it may concern:*

Be it known that I, JOHN E. SIEBEL, of Chicago, in the county of Cook, and State of Illinois, have invented certain new and useful Improvements in the Preparation of Iron for Medical Purposes; and I do hereby declare that the following is a full, clear, and exact description thereof.

To enable others skilled in the art to make and use my invention, I will proceed to describe it.

My invention relates to medical compounds; and consists in the novel production of a new and useful preparation of iron for medical purposes, which I call "Dialized Iron."

This preparation I produce in the following manner:

I take aluminized iron, or hog's bladder, or parchment paper, or any other suitable substance possessing like qualities, and form it into the shape of a box, of any desired size, and having an open top.

The bottom of this box I cover with a solution of any oxide of iron salt, but preferably with a solution of the chloride of iron, to which has been added as much of recently-precipitated hydrated oxide of iron as it will dissolve.

The box, thus prepared, I then cause to float in a large vessel containing distilled water, when, by the peculiar attraction or action of the pores of the substance intervening between the acidulous iron solution on the one side, and the distilled water on the other, the following change is produced:

The hydrochloric or muriatic acid separates from the iron, and passes through the intervening substance, and mingles with the water, leaving the iron behind in the state or form of pure oxide of iron dissolved in ater.

This oxide of iron, dissolved in water thus produced, I term "dialized iron." It is in the same form in which iron is found in the human blood.

By the addition of one "per mille" of chloride of soda, and a small quantity of alcohol, the solution or product thus obtained may be preserved in its original state for any desired length of time.

In this form the iron is free from all acids, and contains nothing injurious to the human system.

As it is in no way affected by the digestion, it is ready as soon as introduced into the stomach to be at once taken up and absorbed.

I have found that the weakest stomachs, almost equally well with the strongest, took it up and passed it into the system without the least inconvenience, and that in all cases in which it was desired to give iron, it has produced the happiest results.

I sometimes, if desired, give it in combination with other drugs or medical compounds, and in this way it may very often be advantageously administered.

Having thus described my invention,

What I claim, is—

1. The process of producing "dialized iron," substantially as herein described and for the purpose set forth.

2. The substance termed "dialized iron," when produced substantially as herein described, for medicinal purposes, either alone or in combination with other substances.

JOHN E. SIEBEL.

Witnesses:
   WM. H. LOTZ,
   H. FISCHBECK.